(12) United States Patent
Shrivastava et al.

(10) Patent No.: US 10,614,498 B2
(45) Date of Patent: Apr. 7, 2020

(54) SYSTEM, METHOD, AND NON-TRANSITORY COMPUTER-READABLE STORAGE MEDIA FOR EFFICIENT STORAGE, PROCESSING AND EXCHANGE OF PRODUCT INFORMATION

(71) Applicant: Wal-Mart Stores, Inc., Bentonville, AR (US)

(72) Inventors: Abhishek Shrivastava, Sunnyvale, CA (US); Nikesh Garera, Bangalore (IN); Digvijay Lamba, Sunnyvale, CA (US); Gurmeet Singh, Dwarka (IN); Tabassum Parveen, Bangalore (IN)

(73) Assignee: WALMART APOLLO, LLC, Bentonville, AR (US)

( * ) Notice: Subject to any disclaimer, the term of this patent is extended or adjusted under 35 U.S.C. 154(b) by 896 days.

(21) Appl. No.: 14/751,842

(22) Filed: Jun. 26, 2015

(65) Prior Publication Data
US 2016/0378838 A1 Dec. 29, 2016

(51) Int. Cl.
| G06F 7/00 | (2006.01) |
| G06Q 30/06 | (2012.01) |
| G06F 16/9535 | (2019.01) |
| G06F 17/21 | (2006.01) |

(52) U.S. Cl.
CPC ..... *G06Q 30/0623* (2013.01); *G06F 16/9535* (2019.01); *G06F 17/211* (2013.01)

(58) Field of Classification Search
CPC .................................................. G06F 17/211
See application file for complete search history.

(56) References Cited

U.S. PATENT DOCUMENTS

| 6,473,760 | B1* | 10/2002 | Klatt ..................... G06Q 30/02 |
| 8,069,096 | B1* | 11/2011 | Ballaro ................ G06Q 10/087 |
| | | | 705/27.2 |
| 8,756,117 | B1* | 6/2014 | Ballaro ................ G06Q 10/087 |
| | | | 705/26.1 |
| 9,495,698 | B2* | 11/2016 | Evers ................. G06Q 30/0603 |
| 2007/0150387 | A1* | 6/2007 | Seubert .................. G06Q 10/10 |
| | | | 705/31 |
| 2008/0120129 | A1* | 5/2008 | Seubert .................. G06Q 10/06 |
| | | | 705/35 |
| 2009/0254971 | A1* | 10/2009 | Herz ..................... G06Q 10/10 |
| | | | 726/1 |

(Continued)

*Primary Examiner* — Eliyah S. Harper
(74) *Attorney, Agent, or Firm* — Bryan Cave Leighton Paisner LLP (57) ABSTRACT

A system, method, and computer-readable storage media, having computer-executable instructions embodied thereon, for organizing and describing product information is provided. The system includes a memory device, an IDML module, and a display module. The memory device is configured to store product data in a plurality of product records. Each product record is associated with an associated one of a plurality of products and has an associated product type. The product records provide may be used to the efficient storage, processing and exchange of product information. The IDML module is configured to receive a product request and receive, from the memory device, results data associated with the product request. The results data includes a plurality of product records. The display module receives the results data and responsively displays the results data associated with the product request.

27 Claims, 6 Drawing Sheets

(56) References Cited

U.S. PATENT DOCUMENTS

| | | | | |
|---|---|---|---|---|
| 2011/0131241 A1* | 6/2011 | Petrou | ............... | G06F 16/95 |
| | | | | 707/770 |
| 2012/0259882 A1* | 10/2012 | Thakur | ............ | G06Q 30/0625 |
| | | | | 707/767 |
| 2015/0235143 A1* | 8/2015 | Eder | ............... | G16H 50/50 |
| | | | | 706/12 |

* cited by examiner

# SYSTEM, METHOD, AND NON-TRANSITORY COMPUTER-READABLE STORAGE MEDIA FOR EFFICIENT STORAGE, PROCESSING AND EXCHANGE OF PRODUCT INFORMATION

FIELD OF THE DISCLOSURE

The present invention relates to providing product information to a consumer, and more particularly, to systems, methods, and computer-readable storage media that generates and displays product information as a function of a request from a website.

BACKGROUND

Many consumers desire to order items or goods remotely, e.g., on-line, through the Internet, or using a specially designed application or app on a personal computer or mobile device, such as a tablet or cell phone. Information related to products may be displayed within the application or app based on predetermined criteria (e.g., featured products) or based on specific requests for products in a specific category or customer input search queries. For example, at least some known web hosting systems include search engines that allow consumers to enter search criteria and generate search results based on the consumer's search criteria. Known search engines may generate and display product lists to consumers via a website including products that are selected based on the search criteria.

In general, the product information that is displayed may be gathered from many different sources. The product information to be displayed is unstructured, and thus, it is hard for the consumer or customer to make sense of the presented data. If the customer cannot make sense of the data, then the customer is likely to ignore the present invention.

Attempts to parse or format the data prior to the data being available for viewing, slowed down the process of making enriched content available to the customer. Such attempts also places a huge burden on the analysts and producers responsible for generating the data for the application or app. Further some of the available information could not be retrofitted, and thus included, in a generic format, so such data is simply rejected as being in a "non-supported format".

If certain information is available for a product, but is not included in the application or app, then the lack of quality content may lead to a poor customer experience and decreased sales. Further, the huge burden in terms of work hours required to intake and format product related data to make it available on the application or app results in higher costs and lost opportunity due to the time lag necessary to intake and parse the information.

The present invention is aimed at one or more of the problems identified above.

SUMMARY OF THE INVENTION

In different embodiments of the present invention, systems, methods, and computer-readable storage media allow users to display relevant product information to a consumer via a website.

In one embodiment of the present invention, a system for organizing and describing product information is provided. The system includes a memory device, an IDML module, and a display module. The memory device is configured to store product data in a plurality of product records. Each product record is associated with an associated one of a plurality of products and has an associated product type. The associated product type is one of a plurality of predefined product types. Each of the plurality of predefined product types has at least one product data module having an associated module type. The associated module type has an associated module type. The associated module type is one of a plurality of predefined module types. Each one of the plurality of predefined module types defines a data structure of data to be stored therein. The IDML module is configured to receive a product request and receive, from the memory device, results data associated with the product request. The results data includes a plurality of product record. The display module receives the results data and responsively displays the results data associated with the product request.

In another embodiment of the present invention, a method is provided. In a first step, product data is stored, on a memory device, in a plurality of product records. Each product record is associated with an associated one of a plurality of products and has an associated product type. The associated product type is one of a plurality of predefined product types. Each of the plurality of predefined product types has at least one product data module having an associated module type. The associated module type has an associated module type. The associated module type is one of a plurality of predefined module types. Each one of the plurality of predefined module types defines a data structure of data to be stored therein. The method further includes the step of receiving, at an IDML module coupled to the memory device, a product request and receiving, from the memory device, results data associated with the product request, the results data including a plurality of product records. The method also includes the steps of receiving, at a display module coupled to the IDML module, the results data and responsively displaying the results data associated with the product request.

In still another embodiment of the present invention, one or more non-transitory computer-readable storage media, having computer-executable instructions embodied thereon, wherein when executed by at least one processor, the computer-executable instructions cause the processor to operate as a memory device, an IDML module, and a display module. The memory device is configured to store product data in a plurality of product records. Each product record is associated with an associated one of a plurality of products and has an associated product type. The associated product type is one of a plurality of predefined product types. Each of the plurality of predefined product types has at least one product data module having an associated module type. The associated module type has an associated module type. The associated module type is one of a plurality of predefined module types. Each one of the plurality of predefined module types defines a data structure of data to be stored therein. The IDML module is configured to receive a product request and receive, from the memory device, results data associated with the product request. The results data includes a plurality of product record. The display module receives the results data and responsively displays the results data associated with the product request.

BRIEF DESCRIPTION OF THE FIGURES

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings wherein.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

The disclosure particularly describes how product information may be displayed via a website to a consumer to increase the likelihood of the consumer purchasing one or more products being displayed and increase a conversion rate of the corresponding webpage. The conversion rate may be indicative of a rate at which a corresponding web page facilitates a user completing a predefined user activity such as, for example, viewing a predefined web page, ordering a product and/or service, and/or performing a predefined user task.

Particularly, the present disclosure describes how a system provides a website, application, or app to a consumer that contains product related data. The product related data may be initiated or generated, e.g., in response to a customer initiated search on a search webpage and generates.

Product data is stored (and retrieved from) a database. In general, the product related data is stored in a standard structured format that represents the rich content associated with a specific item. Products or items or classified based on the type of product (or product type). Exemplary product types may be, for example, books, cellular phones, televisions, toothpaste, bath towels, etc. . . . . It is envisioned that all products that may be available on the website have an associated product type.

As discussed in more depth below, each product type is composed a number of standard parts and constructed to fit the products classified by the product type. The standard format for that product type is designed to be a standard such that all producers or suppliers of products of the associated product type are required to provide product data in the specified format.

In one embodiment, product related data may be displayed in a ranked product list to the consumer in response to the request. The ranked product list is generated as a function of a plurality of categories associated with product records. The system generates a plurality of sorted groups based on the product record categories to generate the product list to display products that are relevant to the request of the consumer.

For example, in one embodiment, the system may generate search data including a plurality of product records associated with a search request received from a consumer with each of the product records including a plurality of record categories such as, for example, a product category, a product price, and/or a relevance score. The system may analyze the search data and generate a plurality of sorted groups and/or data buckets as a function of the frequency at which each product category appears in the search data. For example, the system may generate one or more first sorted groups including product records having associated product categories that appear most frequently in the search data. The system may also select a relevance score and generate a second sorted group as a function of the selected relevance score.

Since the product data is required to be provided and stored in the formatted structure dictated by the product type, collection, disbursement and display of the information to the consumer is fast and efficient.

Figure 1:
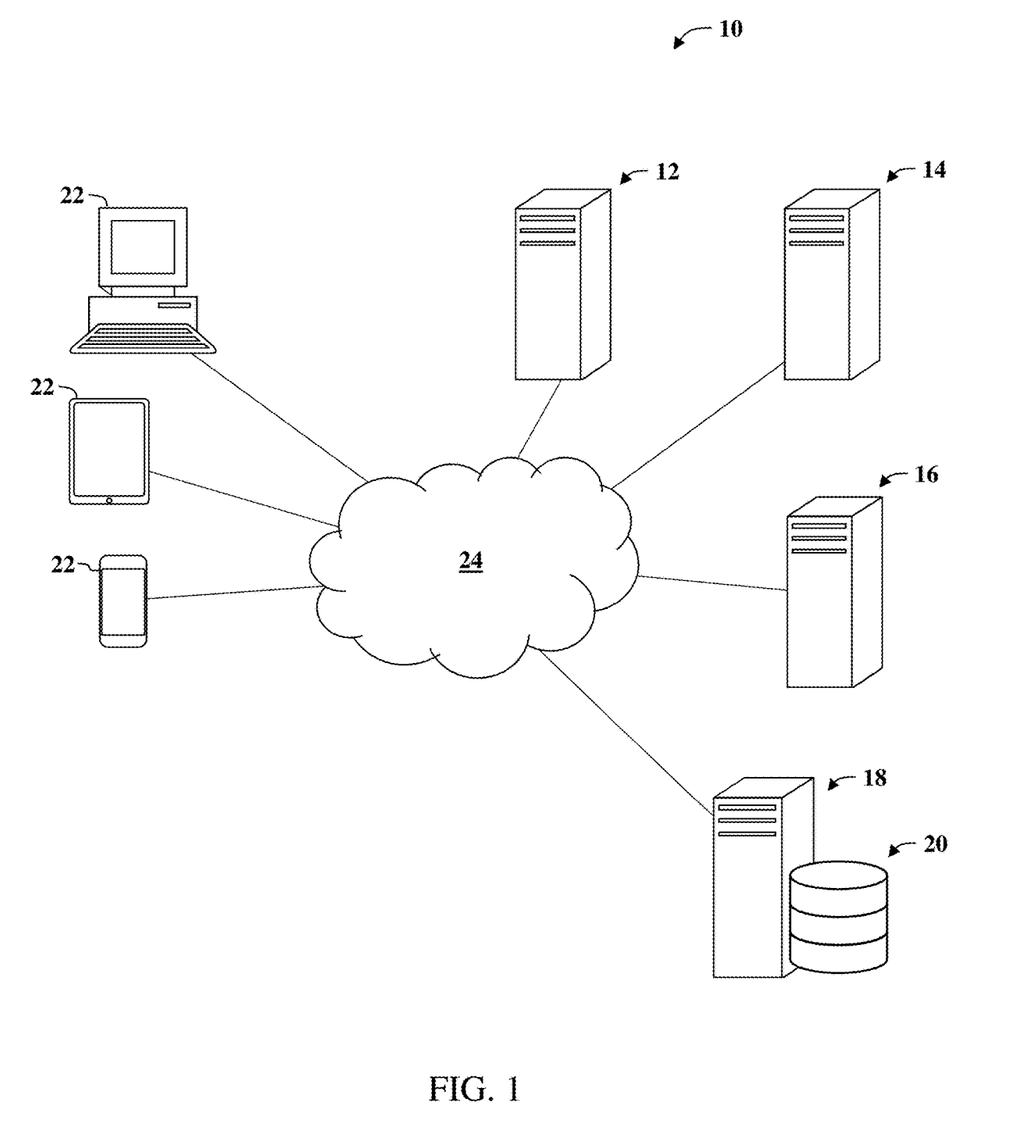
FIG. 1 is a schematic illustrating various aspects of a system, according to the present disclosure.

With reference to the FIGS. and in operation, the present invention provides a system 10, methods and computer product media that facilitates displaying product information to a user via a website. Referring to FIG. 1, an exemplary environment in which the system 10 operates is illustrated. In the illustrated embodiment, the system 10 is configured to enable a user to access a website with one or more user computing devices to view information indicative of products that may be purchase by the user via the website. In general, the system 10 generates and displays product lists in response to receiving a product search request from a consumer via a website. The system 10 generates search data including a plurality of product records as a function of the search request, and analyses the search data and generates sorted groups of product records based on one or more data categories included in the product records.

For clarity in discussing the various functions of the system 10, multiple computers and/or servers are discussed as performing different functions. These different computers (or servers) may, however, be implemented in multiple different ways such as modules within a single computer, as nodes of a computer system, etc. . . . The functions performed by the system 10 (or nodes or modules) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

In the illustrated embodiment, the system 10 includes a website hosting server 12, a search engine server 14, a sorting server 16, a database server 18, a database 20, and one or more user computing devices 22 that are each coupled in communication via a communications network 24. The communications network 24 may be any suitable connection, including the Internet, file transfer protocol (FTP), an Intranet, LAN, a virtual private network (VPN), cellular networks, etc. . . . , and may utilize any suitable or combination of technologies including, but not limited to wired and wireless connections, always on connections, connections made periodically, and connections made as needed.

The user computing device 22 may include any suitable device that enables a user to access and communicate with the system 10 including sending and/or receiving information to and from the system 10 and displaying information received from the system 10 to a user. For example, in one embodiment, the user computing device 22 may include, but is not limited to, a desktop computer, a laptop or notebook computer, a tablet computer, smartphone/tablet computer hybrid, a personal data assistant, a handheld mobile device including a cellular telephone, and the like.

The database server 18 includes a memory device that is connected to the database 20 to retrieve and store information contained in the database 20. The database 20 contains information on a variety of matters, such as, for example, web pages associated with one or more websites, customer account information, product records, data categories, category values, sorted data groups, and/or any suitable information that enables the system 10 to function as described herein.

Figure 4:
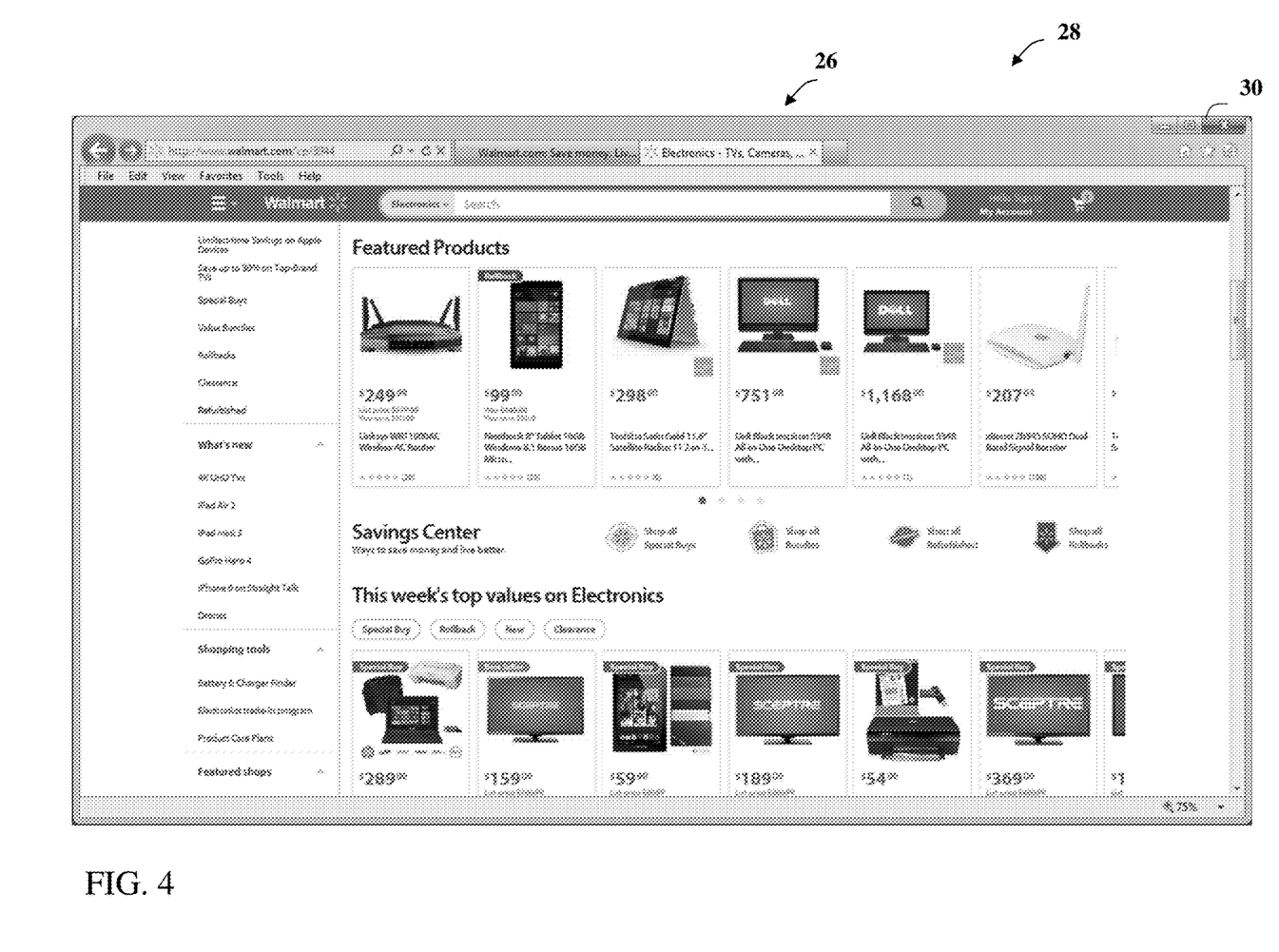
FIG. 4 is an illustration of an exemplary screenshot from the system of FIG. 1, according to an embodiment of the present invention.
Figure 5:
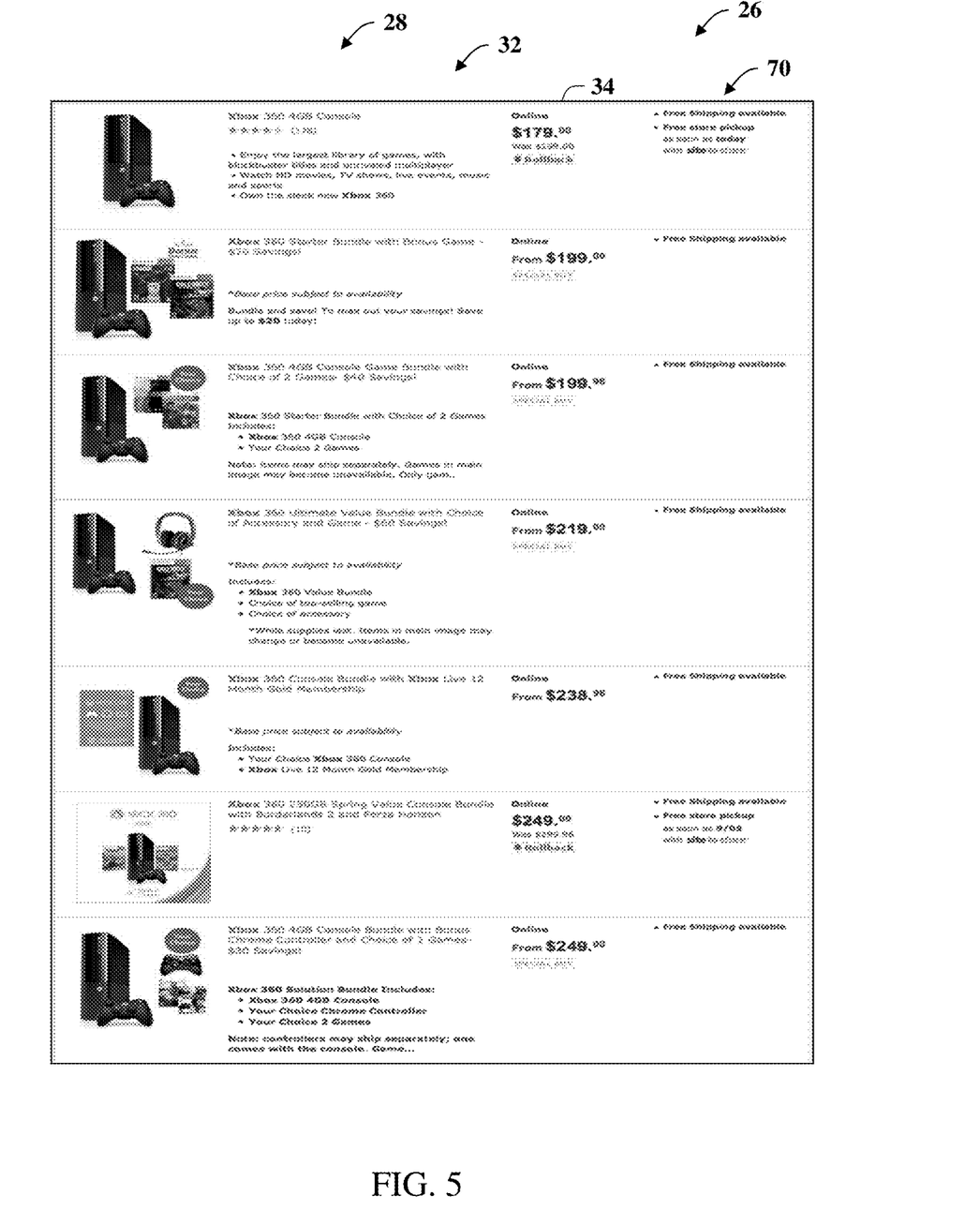
FIG. 5 is an illustration of an exemplary screenshot from the system of FIG. 1, according to an embodiment of the present invention; and, FIG. 6 is a block diagram of an exemplary system in use, according to another embodiment of the present invention.

The website hosting server 12 is configured to host a website 26 that is accessible by a user via one or more user computing devices 22. The website hosting server 12 retrieves and stores web pages 28 (shown in FIGS. 4 and 5) associated with one or more websites 26 in response to requests received by the user via the user computing device 22 to allow users to interact with the website and search and/or purchase products such as, for example, goods and/or services via the website. In one embodiment, the website hosting server 12 is configured to generate and display web pages 28 associated with the website in response to requests being received from consumers via corresponding web browsers that are displayed on the user computing devices 22. For example, in one embodiment, the website hosting server 12 may display a product search webpage 30 (shown in FIG. 4) in response to receiving a user request that allows a user to input a product search request including search criteria including one or more search terms. In addition, the website hosting server 12 may transmit the product search request to the search engine server 14 and/or the sorting server 16 for use in generating search data and/or product lists in response to the user's search request. The website hosting server 12 may also receive one or more product lists 32 (shown in FIG. 5) from the search engine server 14 and/or the sorting server 16 that includes information associated with products that are selected based on the user's search criteria. The website hosting server 12 may also display a search results webpage 34 to display the product lists 32 to the user and to allow the user to select one or more of the displayed products for purchase.

In the illustrated embodiment, the search engine server 14 is configured to receive a product search request from the website hosting server 12 including one or more search terms, and generate search data including a plurality of product records as a function of the search terms. For example, in one embodiment, the search engine server 14 may initiate a search algorithm based on a Boolean model to search product records contained in the database 20 based search terms received from the user. One system that provides a suitable system 10, including a search engine server 14 is disclosed in U.S. patent application Ser. No. 14/633,022, filed on Feb. 26, 2015 which is disclosed herein by reference.

Figure 2:
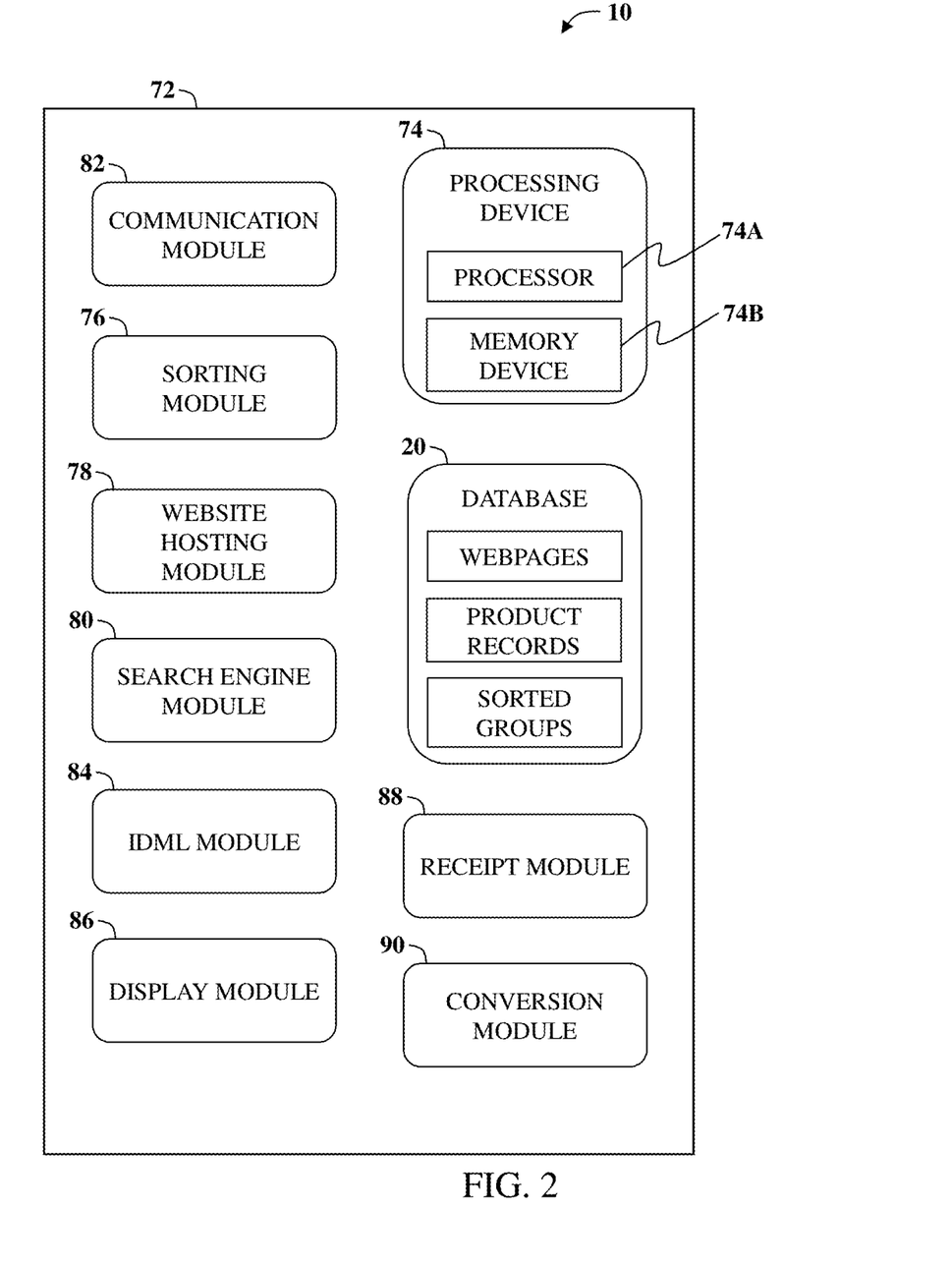
FIG. 2 is a schematic illustrating example components of a server, according to an embodiment of the present invention.

Referring to FIG. 2, in one embodiment, the system 10 may include a system server 72 that is configured to perform the functions of the website hosting server 12, the search engine server 14, the sorting server 16, and the database server 18. In the illustrated embodiment, the system server 72 includes a processing device 74 and the database 20.

The processing device 74 executes various programs, and thereby controls components of the system server 72 according to user instructions received from the user computing device 22. The processing device 74 may include a processor or processors 74A and a memory device 74B, e.g., read only memory (ROM) and random access memory (RAM), storing processor-executable instructions and one or more processors that execute the processor-executable instructions. In embodiments where the processing device 74 includes two or more processors 74A, the processors 74A can operate in a parallel or distributed manner. In an example, the processing device 74 may execute a sorting module 76, a website hosting module 78, and a search engine module 80, a communications module 82, and an IDML module 84, and a price display module 86.

The memory device 74B may be configured to store programs and information in the database 20, and retrieving information from the database 20 that is used by the processor to perform various functions described herein. The memory device may include, but is not limited to, a hard disc drive, an optical disc drive, and/or a flash memory drive. Further, the memory device may be distributed and located at multiple locations.

The communications module 82 retrieves various data and information from the database 20 and sends information to the user computing device 22 via the communications network 24 to enable the user to access and interact with the system 10. In one embodiment, the communications module 82 displays various images on a graphical interface of the user computing device 22 preferably by using computer graphics and image data stored in the database 20 including, but not limited to, web pages, product records, sorted groups, product lists, and/or any suitable information and/or images that enable the system 10 to function as described herein.

The website hosting module 78 may be programmed to perform some or all of the functions of the website hosting server 12 including hosting various web pages associated with one or more websites that are stored in the database 20 and that are accessible to the user via the user computing device 22. The website hosting module 78 may be programmed to generate and display web pages associated with a website in response to requests being received from users via corresponding web browsers.

The search engine module 80 may be programmed to perform some or all of the functions of the search engine server 14 including generating and storing search data 36 in response to the user's product search request. In addition, the search engine module 80 may also be programmed to generate a relevance score associated with each of the product records 38 included in the search data 36.

The sorting module 76 may be programmed to perform some or all of the functions of the sorting server 16 including selecting a first sorting value and generating a first sorted group of product records as a function of the first sorting value, and selecting a second sorting value and generating a second sorted group as a function of the product records included in the first sorted group and the second sorting value. In addition, the sorting module 76 may also be programmed to generate a product list as a function of the second sorted group and display the product list on a website in response to the product search request.

As discussed above, the memory device 74B is configured to store product data associated with a plurality of products. The product data may include pricing information and access information related to the plurality of products. In general, the access information provides information related to expressed customer interest in a product. For example, the access information may include, but is not limited to, (the number of) prior purchases by customers of the product, inclusion of the product in prior search results by customers, "clicks" or "click-throughs" by customers, i.e., selection of a hyper-link in the search results to access additional information about the product, and/or any combination thereof.

As discussed above, the search engine module 80 is coupled to the memory device 74B and is configured to receive a product search request and receive, from the memory device 74B, search results data associated with the product search request. The search results data will generally include a plurality of product records. Each of the product records includes a price assigned with the associated product and an access number associated with the product. The access number is related to a number of times the product has been accessed by a plurality of customers.

The IDML module 84 is coupled to the search engine module 80 and the memory device 74B and is configured to receive a product request and receive, from the memory device 74B, results data associated with the product request. In general, the results data will include a plurality of product records. The product request may be generated via a product search input by the consumer or be initiated by the website, e.g., a featured product list.

The display module 84 is coupled to the search engine module 80 and the IDML module 84 to receive the results data and to responsively generate the list of products and related data to be displayed on the user computing device 22.

The display module 22 may be implemented, at least in part, on the user computing device 22. For example, the memory device 74B and the IDML module 84 may be implemented using one or more servers and the display module 86 may be implemented, at least in part, on a user display of a user computing device coupled to the one or more servers across a network.

Product data is stored in the memory device 74B in a plurality of records. Each one of the plurality of product records has an associated product type. The associated product type is selected from a plurality of predefined product types, e.g., books, food, electronics, televisions, cell phones, toothpaste, etc. . . . Each product within the same product type has similar product data that is used to describe the product. The product data may thus be formatted or configured until the same data structure. Thus, each product type includes at least one product data module.

For example, product data related to a particular book may be stored in a product record classified using a "book" product type. The book product type may include the following product data modules: title, author, table of contents, author biograph, previews, etc. . . . Product data related to a particular food product may be stored in a product record classified using a "food" product type. The food product type may include the following product data modules: nutritional facts, ingredients, directions to use, etc. . . . Product data related to particular electronics device may be stored in a product record classified using a (general) electronics product type. The general electronics product type may include the following product data modules: specification, comparison tables, video reviews, etc.

Each product data module has an associated module type. The associated module type is selected from a plurality of predefined module types. Each of the predefined module types defines a data structure of data to be stored therein. The predefined module types are general in nature, i.e., the predefined module types do not define the information to be stored therein. Rather the predefined module types define the data-dimensionality, and thus product data modules having the same (abstract) module type have the same structural definition. The abstract module type for a particular product data module is chosen only on the basis of the underlying data-dimensionality.

In one embodiment, the set of predefined module types includes:
  a single attribute value (SAV) type,
  a multiple attribute value (MAV) type,
  a single attribute list of property groups (SALPG) type,
  a multiple attribute list of property groups (MALPG) type, and
  a multiple attribute with children and list of property groups (MACLPG) type.

As an illustrative example, the product database may include product records for two products, each associated with a different product types. One of the product records includes one of (a) a first product data module having an associated one of the plurality of predefined modules types, and/or (b) at least two product data modules (each having a different one of the plurality an associated different one of the plurality of predefined module types), and/or (c) a plurality of product data modules. Each of the plurality of product modules may have an associated one of the plurality of predefined modules that is the same or different as another of the plurality of product modules.

In another aspect of the present, each of the predefined module types may be composed of at least one data node. The at least one data node may be an attribute value node (AV node) or a property value node (PV node).

In one embodiment, the property records (and the underlying format definitions) may be created using JavaScript Object Notation or JSON. Structurally, the AV and PV nodes are the building blocks of the property record. The basic schema of an attribute-value JSON node (AV node) may be written as

```
{
    Attribute: "<a unique identifier for this attribute>",
    DisplayName: "<a more readable name that can be displayed
    to user>",
    Value: <data of this attribute>,
    DataType: "<type of the value>", // optional
    Child: <list of one or more AVNodes> // only present for MACLPG
}
```

The basic schema of an property-value JSON node (PV node) may be expressed as:

```
{
    Property: "<unique identifier of the property>",
    DisplayName: "<a more readable name for the property>",
    Value: <data of this property>,
    DataType: "<type of the value>"
}
```

Returning to FIG. 2, the system 10 may also include a receipt module 88 coupled to the memory device 74B. The receipt module 88 is configured to receive product records from an external party (not shown) and to store the product records in the memory device 74B. The product records received from the external party are already formatted using the defined product types and underlying data structures. In other words, the product records received from the external party have an associated one of the predefined product types.

A conversion module 90 may also be provided. The conversion module 90 is coupled to the memory device and is configured to receive non-compliant product data and to facilitate conversion of the non-compliant product data into product records having an associated product type. For example, in one embodiment the non-compliant product data may be provided in a format for which the underlying structure is known. For example, data related to books may be provided in an Online Information Exchange (ONIX) protocol. The conversion module 90 may include an automated parser that converts the data provided in the ONIX protocol into product records for use with the system 10.

In one embodiment of the present invention, the memory device may include one or more of the memory devices and/or mass storage devices of one or more of the computing devices or servers. The modules that comprise the invention are composed of a combination of hardware and software, i.e., the hardware as modified by the applicable software applications. In one embodiment, the units of the present invention are comprised of one of more of the components of one or more of the computing devices or servers, as modified by one or more software applications.

Figure 3:
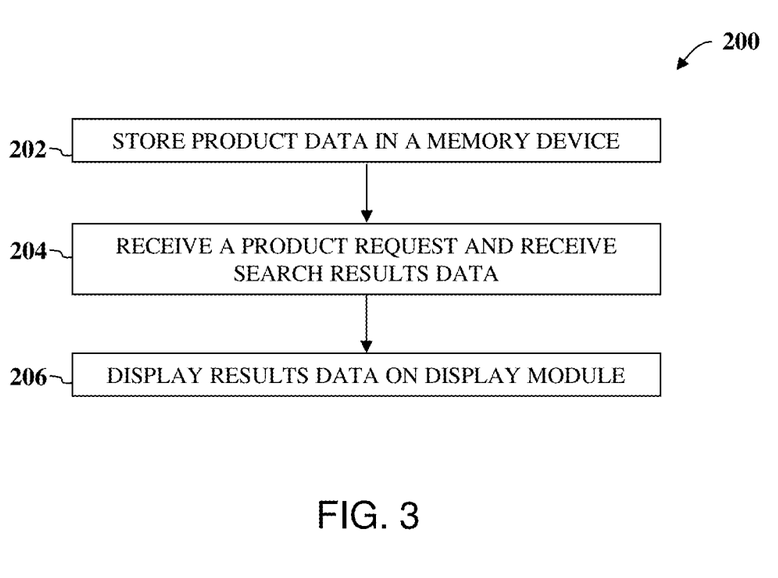
FIG. 3 is a flowchart of a method that may be used with the system shown in FIG. 1, according to an embodiment of the present invention.

FIG. 3 is a flowchart of method 200 that may be used with the system 10 for displaying product information on a website. The method includes a plurality of steps. Each method step may be performed independently of, or in combination with, other method steps. Portions of the method may be performed by any one of, or any combination of, the components of the system 10.

In a first step 202, product data associated with a plurality of products is stored in a memory device 74B. The product data may include pricing information and access information related to the plurality of products. As discussed above, the product data is stored in a plurality of product data records. Each record is related to a specific product or item and has an associated product type. The product type dictates the structured format of the data record (see above), and thus, the information that may be included in the product record. In a second step 204, a product request is received at a search engine module 80 and/or the IDML module 84. The search results are received at the IDML module 84 from the memory device 74B. The search results data may include a plurality of product records.

In a third step 206, the results data (in the form of product records) are displayed on the consumer electronics device 22 via the display module 86.

INDUSTRIAL APPLICABILITY

The present invention is aimed at systems and method that generates product data to be displayed on a commercial website. The product data is stored in product records. Each product record has an associated product type based on the associated product. The product type defines/dictates the format of the product data stored in the database.

In one embodiment of the present invention, the general aim of the system is to utilize a well-defined standard format that provides producers and retailers a way in which to represent product type across a wide variety of products and product types. In one embodiment, known as Item Description Markup Language (IDML), each product type is composed of one or more product data modules. IDML represents a data format or specification that is designed to allow structural representation of any rich content associated with a product in electronic form, irrespective of the underlying complexity of the data. Each data module is one of a 5 predefined sub-types or module type. In one embodiment the 5 predefined sub-types are:
  a single attribute value (SAV) type,
  a multiple attribute value (MAV) type,
  a single attribute list of property groups (SALPG) type,
  a multiple attribute list of property groups (MALPG) type, and
  a multiple attribute with children and list of property groups (MACLPG) type.
IDML provides for:
  a standardized way of information exchange of electronic data interchange (EDI) for rich product data,
  effective protocol for communication of product data across producer-consumer systems,
  faster ingestion of third-party rich content from external data-providers, and
  open gates for allowed high quality enriched content on product webpages.

IDML provides many benefits. For example, product records using IDML may be created using existing product data. The IDML product records provide a predictable format across different content type and may reduce the time necessary to parse and converting existing data into IDML records. The front end (FE) of the app or commercial application can quickly consume or utilize new content types since the underlying blocks are the same. Further, the use of IDML product records simplifies data parsing and reduces both the development effort (of the commercial application, app or website) and maintenance thereof.

Furthermore, requiring third party product data producers (such as the manufacturers or supplies of the products) to utilize or produce IDML product requires provides for much faster intake of new products, so that the new products of a given or known type and new products having a new product type can be made available to consumers much faster. Since the format is consistent and known, enforcing use of IDML provides the consumer with quality data, thereby increasing the probability that a consumer will purchase a product.

Figure 6:
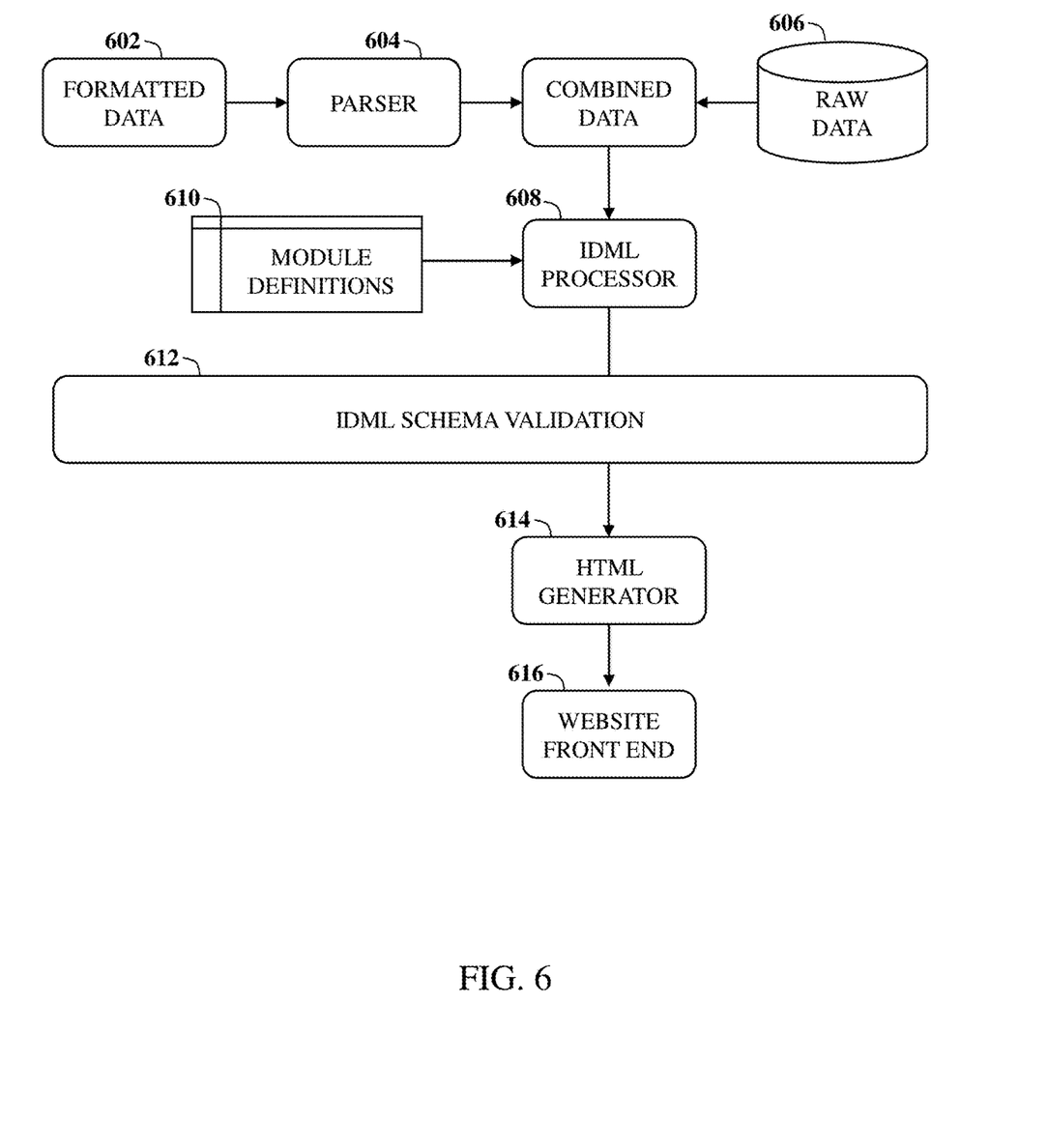

With reference to FIG. 6, a flow diagram of an implementation of the system 10 shown. As discussed above, the product records stored in the memory device 74B are already in the IDML format. Product data that is received from an external source, but is already in the IDML format may be saved directly into the memory device 74B.

Product data 602 may also be received that is formatted in a known, but non-IDML format. For this type of data an (automated) parser 604 may be used to automatically convert this data into the IDML format.

Raw data 606 is, for example, an unstructured collection of data related to a specific product may have to be formatted and parsed manually. Once the information has been processed, the combined data may be converted into product records at an IDML processer 608 based on the module definitions 610. The IDML processor 608 is designed to transform unstructured data into structure IDML product records. The module definitions are used to ensure that the IDML module matches the website. The module definitions 610 define, e.g., the "colors", "fonts" and general "look and feel" of that IDML module. Generally, a set of predefined "templates" are used for each module. The templates are used to render the incoming IDML modules and convert them into browser-compatible HTML code.

Once structured IDML product records are generated, the product records must be validated for structural validity (IDML Schema Validation 610). This process may be seen as a "gatekeeper" that monitors the generated IDML product records and flags any product record that does not follow the defined standard schema. Any flagged product record is placed on hold, and thus, blocked from being exposed to the customers/consumers. The product record is held until it can be reviewed and debugged.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A system, comprising:
one or more processors; and
memory storing one or more programs to be executed by the one or more processors, the one or more programs comprising instructions for:
receiving and storing in a memory device a first product data pre-formatted in a pre-defined data structure required by suppliers that represent rich content stored in a database, the first product data comprising a plurality of product records, wherein product records of the plurality of product records have a similar product type, wherein the similar product type is one of a plurality of predefined product types, wherein each of the plurality of predefined product types are defined by a specific data-dimensionality corresponding to a data structural definition of a particular data structure, and wherein each one of the plurality of predefined product types defines the particular data structure of data stored therein;
receiving and storing a second product data pre-formatted in the pre-defined data structure in the database, the second product data comprising the plurality of product records, wherein the second product data is received from an external party and comprises the plurality of predefined product types and data structures;
receiving and storing a third product data pre-formatted in an unknown data structure in the database, the third product data comprising the plurality of product records, wherein the third product data comprises the plurality of predefined product types and the data structures;
converting, with an Item Description Markup Language (IDML) engine, the plurality of product records from the first product data, the second product data, and the third product data into IDML records, wherein the IDML records are formatted into a format usable by one or more content types, and wherein the converting comprises using a pre-defined template comprising product definitions to transform the plurality of product records from a respective data structure into a browser-compatible code, wherein the browser-compatible code of the IDML records is displayed in a structural representation in electronic form;
storing the IDML records of the first, second, and third product data, as converted from the plurality of product records in the memory device;
receiving, by a search engine in data communication with (a) the IDML engine and (b) the memory device, a product request for at least some of the first, second, and third product data, wherein the search engine communicates with the IDML engine to convert unstructured product records retrieved as a result of the receiving the product request;
retrieving, with the IDML engine, at least a portion of the at least some of the first, second, and third product data, as converted, with the similar product type matching the product request;
receiving, by the IDML engine in data communication with the memory device, final search results data responsive to the product request, the final search results data comprising the at least the portion of the at least some of the first, second, and third product data, as converted; and
sending instructions for displaying, by a display module in data communication with the IDML engine, the final search results data responsive to the product request.

2. A system, as set forth in claim 1, wherein the memory device and the IDML engine are implemented using one or more servers, and the display module is implemented on a user display of a user computing device in data communication with the one or more servers across a network.

3. A system, as set forth in claim 1, wherein the plurality of predefined product types includes a single attribute value (SAV) type, a multiple attribute value (MAV) type, a single attribute list of property groups (SALPG) type, a multiple attribute list of property groups (MALPG) type, and a multiple attribute with children and list of property groups (MACLPG) type.

4. A system, as set forth in claim 3, wherein the plurality of predefined product types associated with one of the product records has one of (a) the first product data, (b) at least two product data types, each having a different one of the plurality of predefined product types, and (c) a plurality of product data structures, each of the plurality of product data structures having an associated one of the plurality of predefined product types that is different than another of the plurality of predefined product types.

5. A system, as set forth in claim 3, wherein each of the plurality of predefined product types includes at least one data node.

6. A system, as set forth in claim 5, wherein the at least one data node is an attribute value node or a property value node.

7. A system, as set forth in claim 1, further comprising a receipt module in data communication with the memory device, wherein the receipt module receives first product records from an external party previously formatted in an IDML format and stores the first product records in the memory device.

8. A system, as set forth in claim 1, further comprising a conversion system in data communication with the memory device to facilitate conversion of the third product data pre-formatted into the unknown data structure into the plurality of product records having a similar product type.

9. A system, as set forth in claim 8, wherein the third product data pre-formatted into the unknown data structure is structured using a known data format.

10. A method, comprising:

receiving and storing, with a computer system using one or more processors, in a memory device, a first product data pre-formatted in a pre-defined data structure required by suppliers that represent rich content stored in a database, the first product data comprising a plurality of product records, wherein product records of the plurality of product records have a similar product type, wherein the similar product type is one of a plurality of predefined product types, wherein each of the plurality of predefined product types are defined by a specific data-dimensionality corresponding to a data structure definition of a particular data structure, and wherein each one of the plurality of predefined product types defines the particular data structure of data stored therein;

receiving and storing, with the computer system, a second product data pre-formatted in the pre-defined data structure in the database, the second product data comprising the plurality of product records, wherein the second product data is received from an external party and comprises the plurality of predefined product types and data structures;

receiving and storing, with the computer system, a third product data pre-formatted in an unknown data structure in the database, the third product data comprising the plurality of product records, wherein the third product data comprises the plurality of predefined product types and with the data structures;

converting, with an Item Description Markup Language (IDML) engine, the plurality of product records from the first product data, the second product data, and the third product data into IDML records, wherein the IDML records are formatted into a format usable by one or more content types, and wherein the converting comprises using a pre-defined template comprising product definitions to transform the plurality of product records from a respective data structure into a browser-compatible code, wherein the browser-compatible code of the IDML records is displayed in a structural representation in electronic form;

storing, with the computer system, the IDML records of the first, second, and third product data, as converted from the plurality of product records in the memory device;

receiving, by a search engine in data communication with (a) the IDML engine and (b) the memory device, a product request for at least some of the first, second, and third product data, wherein the search engine communicates with the IDML engine to convert unstructured product records retrieved as a result of the receiving the product request;

retrieving, with the IDML engine, at least a portion of the at least some of the first, second, and third product data, as converted, with the similar product type matching the product request;

receiving, by the IDML engine in data communication with the memory device, final search results data responsive to the product request, the final search results data comprising the at least the portion of the at least some of the first, second, and third product data, as converted; and, sending instructions for displaying, with the computer system, by a display module in data communication with the IDML engine, the final search results data responsive to the product request.

11. A method, as set forth in claim 10, wherein the memory device and the IDML engine are implemented using one or more servers and the display module is implemented on a user display of a user computing device in data communication with the one or more servers across a network.

12. A method, as set forth in claim 10, wherein the plurality of predefined product types includes a single attribute value (SAV) type, a multiple attribute value (MAV) type, a single attribute list of property groups (SALPG) type, a multiple attribute list of property groups (MALPG) type, and a multiple attribute with children and list of property groups (MACLPG) type.

13. A method, as set forth in claim 12, wherein the plurality of predefined product types associated with one of the product records has one of (a) the first product data, (b) at least two product data types, each having a different one of the plurality of predefined product types, and (c) a plurality of product data structures, each of the plurality of product data structures having an associated one of the plurality of predefined product types that is different than another of the plurality of product types.

14. A method, as set forth in claim 12, wherein each of the plurality of predefined product types includes at least one data node.

15. A method, as set forth in claim 14, wherein the at least one data node is an attribute value node or a property value node.

16. A method, as set forth in claim 10, further comprising, at a receipt module in data communication with the memory device, first product records from an external party previously formatted in an IDML format and storing the first product records in the memory device.

17. A method, as set forth in claim 10, further comprising, at a conversion system in data communication with the memory device, facilitating conversion of the third product data pre-formatted into the unknown data structure into the plurality of product records having a similar product type.

18. A method, as set forth in claim 17, wherein the third product data pre-formatted into the unknown data structure is structured using a known data format.

19. One or more non-transitory computer-readable storage media, having computer-executable instructions embodied thereon, wherein when executed by at least one processor, the computer-executable instructions cause the processor to:

receiving and storing in a memory device a first product data pre-formatted in a pre-defined data structure required by suppliers that represent rich content stored in a database, the first product data comprising a plurality of product records, wherein product records of the plurality of product records have a similar product type, wherein the similar product type is one of a plurality of predefined product types, wherein each of the plurality of predefined product types are defined by a specific data-dimensionality corresponding to a data structural definition of a particular data structure, and wherein each one of the plurality of predefined product types defines the particular data structure of data stored therein;

receiving and storing a second product data pre-formatted in the pre-defined data structure in the database, the second product data comprising the plurality of product records, wherein the second product data is received from an external party and comprises the plurality of predefined product types and data structures;

receiving and storing a third product data pre-formatted in an unknown data structure in the database, the third product data comprising the plurality of product records, wherein the third product data comprises the plurality of predefined product types and the data structures;

converting, with an Item Description Markup Language (IDML) engine, the plurality of product records from the first product data, the second product data, and the third product data into IDML records, wherein the IDML records are formatted into a format usable by one or more content types, and wherein the converting comprises using a pre-defined template comprising product definitions to transform the plurality of product records from a respective data structure into a browser-compatible code, wherein the browser-compatible code of the IDML records, is displayed in a structural representation in electronic form;

storing the IDML records of the first, second, and third product data, as converted from the plurality of product records in the memory device;

receiving by a search engine in data communication with (a) the IDML engine and (b) the memory device, a product request for at least some of the first, second, and third product data, wherein the search engine communicates with the IDML engine to convert unstructured product records retrieved as a result of the receiving the product request;

retrieving, with the IDML engine, at least a portion of the at least some of the first, second, and third product data, as converted, with the similar product type matching the product request;

receiving, by the IDML engine in data communication with the memory device, final search results data responsive to the product request, the final search results data comprising the at least the portion of the at least some of the first, second, and third product data, as converted; and sending instructions for displaying, by a display module in data communication with the IDML engine the final search results data responsive to the product request.

20. The one or more non-transitory computer-readable storage media of claim 19, wherein the memory device and the IDML engine are implemented using one or more servers and the display module is implemented on a user display of a user computing device in data communication with the one or more servers across a network.

21. The one or more non-transitory computer-readable storage media of claim 19, wherein the plurality of pre-defined product types includes a single attribute value (SAV) type, a multiple attribute value (MAV) type, a single attribute list of property groups (SALPG) type, a multiple attribute list of property groups (MALPG) type, and a multiple attribute with children and list of property groups (MACLPG) type.

22. The one or more non-transitory computer-readable storage media of claim 21, wherein the plurality of pre-defined product types associated with one of the product records has one of (a) the first product data, (b) at least two product data types, each having a different one of the plurality of predefined product types, and (c) a plurality of product data structures, each of the plurality of product data structures having an associated one of the plurality of predefined product types that is different than another of the plurality of product types.

23. The one or more non-transitory computer-readable storage media of claim 21, wherein each of the plurality of predefined product types includes at least one data node.

24. The one or more non-transitory computer-readable storage media of claim 23, wherein the at least one data node is an attribute value node or a property value node.

25. The one or more non-transitory computer-readable storage media of claim 19, further comprising a receipt module in data communication with the memory device receiving first product records from an external party previously formatted in an IDML format and to store the first product records in the memory device.

26. The one or more non-transitory computer-readable storage media of claim 19, further comprising a conversion system in data communication with the memory device to facilitate conversion of the third product data pre-formatted into the unknown data structure into the plurality of product records having an associated product type.

27. The one or more non-transitory computer-readable storage media of claim 26, wherein the third product data pre-formatted into the unknown data structure is structured using a known data format.

* * * * *